United States Patent
De Blois

(10) Patent No.: US 12,261,512 B2
(45) Date of Patent: Mar. 25, 2025

(54) ACTUATION SYSTEM FOR AN AIRCRAFT ENGINE LUBRICATION PUMP AND ASSOCIATED AIRCRAFT

(71) Applicant: SAFRAN AIRCRAFT ENGINES, Paris (FR)

(72) Inventor: Nicolas Bertrand Georges De Blois, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 145 days.

(21) Appl. No.: 17/995,332

(22) PCT Filed: Mar. 26, 2021

(86) PCT No.: PCT/FR2021/050531
§ 371 (c)(1),
(2) Date: Oct. 3, 2022

(87) PCT Pub. No.: WO2021/198597
PCT Pub. Date: Oct. 7, 2021

(65) Prior Publication Data
US 2023/0142269 A1    May 11, 2023

(30) Foreign Application Priority Data

Apr. 3, 2020   (FR) ...................................... 2003368

(51) Int. Cl.
*F02C 7/06*   (2006.01)
*H02K 7/18*   (2006.01)
(Continued)

(52) U.S. Cl.
CPC ............. *H02K 7/1823* (2013.01); *F02C 7/06* (2013.01); *H02K 7/20* (2013.01); *H02K 11/21* (2016.01);
(Continued)

(58) Field of Classification Search
CPC ......... F02K 7/1823; F02K 7/20; H02K 11/21; H02K 11/30; F02C 7/06; F05D 2220/323;
(Continued)

(56) References Cited

U.S. PATENT DOCUMENTS 6,020,711 A * 2/2000 Rubertus ................ H02K 19/00
318/254.2
6,791,226 B1 * 9/2004 Dhawan .................. H02P 25/18
310/179

(Continued)

FOREIGN PATENT DOCUMENTS

EP        2141041 A1    1/2010

OTHER PUBLICATIONS

International Search Report for issued in Application No. PCT/FR2021/050531 dated Jul. 19, 2021.

(Continued)

*Primary Examiner* — Steven M Sutherland
(74) *Attorney, Agent, or Firm* — McDonald Hopkins LLC

(57) ABSTRACT

An actuation system includes: a generating rotating electrical machine including a first stator including at least one output stator winding; a driving rotating electrical machine including a second rotor, intended to actuate a lubrication pump, and a second stator including at least one input stator winding; an array of switches electrically connected to the at least one output stator winding and to the at least one input stator winding, for electrically connecting them together or disconnecting them from each other depending on the state of the array of switches; and a control device configured to control the array of switches, depending on the state of a control signal, in such a way as to electrically connect or not connect the at least one output stator winding and the at least one input stator winding together.

8 Claims, 1 Drawing Sheet

(51) Int. Cl.
*H02K 7/20* (2006.01)
*H02K 11/21* (2016.01)
(52) U.S. Cl.
CPC .... *F05D 2220/323* (2013.01); *F05D 2220/76* (2013.01)
(58) Field of Classification Search
CPC ... F05D 2220/76; H02P 25/18; H02P 25/1823
See application file for complete search history.

(56) References Cited

U.S. PATENT DOCUMENTS

| | | | |
|---|---|---|---|
| 2010/0145589 A1* | 6/2010 | Kobayashi | B60L 50/61 318/400.11 |
| 2014/0291987 A1* | 10/2014 | Dooley | H02K 16/04 290/34 |
| 2015/0054443 A1* | 2/2015 | Swamy | H02P 23/06 318/504 |
| 2015/0315980 A1* | 11/2015 | Edwards | F02C 9/30 60/740 |
| 2018/0050810 A1 | 2/2018 | Niergarth et al. | |
| 2019/0382121 A1 | 12/2019 | Schwarz et al. | |
| 2019/0382123 A1 | 12/2019 | Schwarz et al. | |

OTHER PUBLICATIONS

Written Opinion for PCT/FR2021/050531 dated Jul. 19, 2021.
Search Report issued in French Patent Application No. 2003368 dated Nov. 27, 2020.

* cited by examiner

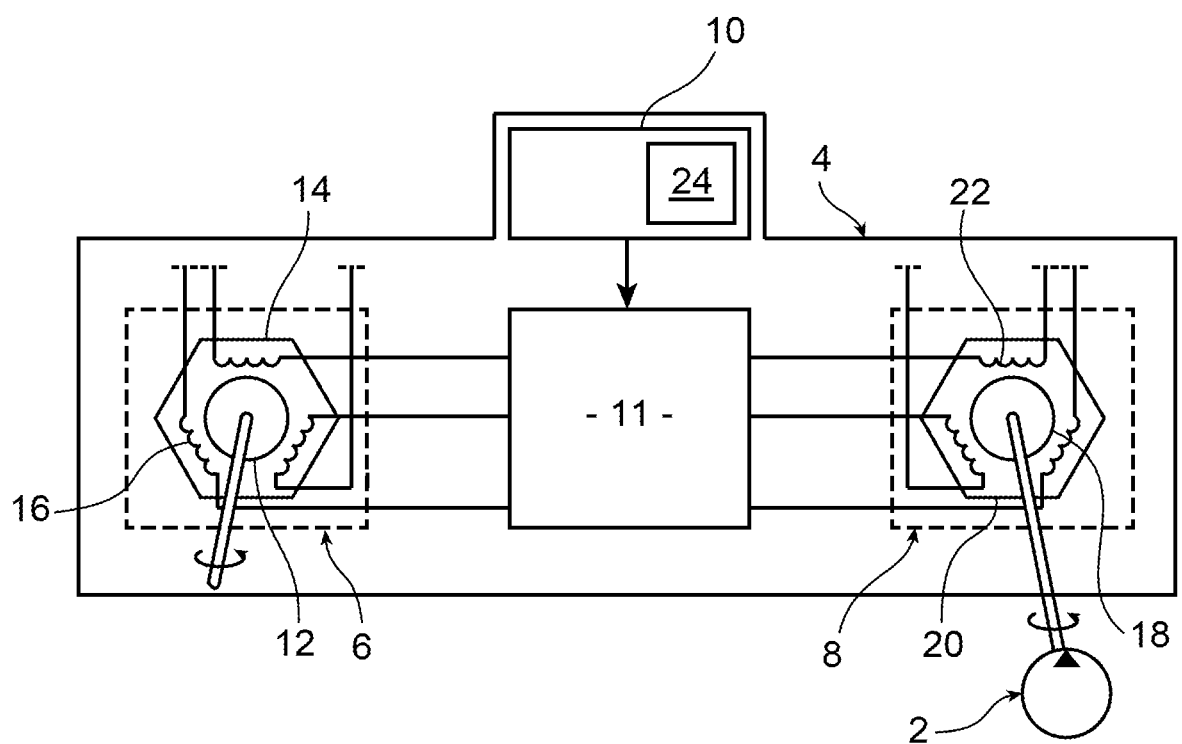

ACTUATION SYSTEM FOR AN AIRCRAFT ENGINE LUBRICATION PUMP AND ASSOCIATED AIRCRAFT

This is the National Stage of PCT international application PCT/FR2021/050531, filed on Mar. 26, 2021 entitled "ACTUATION SYSTEM FOR AN AIRCRAFT ENGINE LUBRICATION PUMP AND ASSOCIATED AIRCRAFT", which claims the priority of French Patent Application No. 2003368 filed Apr. 3, 2020, both of which are incorporated herein by reference in their entireties.

TECHNICAL FIELD

The present invention relates to an actuation system for a lubrication pump of an aircraft engine.

The invention also relates to an aircraft carrying such an actuation system.

The invention applies to the field of aeronautics, in particular to the actuation of a lubrication pump of an engine of an aircraft.

PRIOR ART

Conventionally, in aircraft engines, in particular engines of the UHBR (for "ultrahigh bypass ratio") type, a lubrication pump (called main lubrication pump) tasked with transporting oil to the bearings of the high-pressure and low-pressure shafts, as well as to the transmission of the engine, is used. Such a lubrication pump is driven by the high-pressure shaft through an accessory gearbox (or AGB).

Such engines further comprise an auxiliary lubrication pump, driven by the low-pressure shaft of the engine, and intended to assist the main lubrication pump in the cases in which the latter is no longer capable of correctly carrying out its function. Such a situation occurs in particular in certain cases of the flight mission in which the high-pressure shaft rotates at a low, or even null, speed, the main lubrication pump thus no longer being driven. Such cases comprise, in particular, a turning off of the engine or a phase of autorotation of the fan of the engine (also called windmilling), on the ground or in flight.

However, such an architecture is not without disadvantages. For example, since the low-pressure shaft is capable of rotating in both directions, in particular on the ground under the effect of the wind, it is necessary to use a system of gears with a freewheel to ensure a single direction of rotation of the auxiliary lubrication pump.

Moreover, if an auxiliary lubrication pump operating continuously is adopted, it is necessary to redimension the lubrication circuit to take into account the inclusion of said auxiliary lubrication pump. The implementation of an auxiliary lubrication pump operating occasionally is also problematic, insofar as a disconnectable auxiliary lubrication pump must be provided, which increases the complexity of its implementation.

Moreover, the positioning of the auxiliary lubrication pump in the nacelle is constrained by the drive kinematics.

To overcome these problems, it was proposed to drive the auxiliary lubrication pump, not via the low-pressure shaft, but via an electric motor coupled to said auxiliary lubrication pump, and which is powered by an electric generator while being controlled via a dedicated electronic control member comprising power electronic components.

Nevertheless, such a solution known from the prior art is not entirely satisfactory.

Indeed, during operation, the electronic control member is generally subjected to temperature conditions capable of causing damage to the power electronic components that it contains, which poses problems of reliability. Moreover, the reinforcement or the thermal insulation of such an electronic control member generally translates into an increase in its mass and in its bulk, which, in the present context, is disadvantageous.

One goal of the invention is therefore to propose an actuation system for a lubrication pump, in particular an auxiliary lubrication pump, of an aircraft engine which is reliable and robust, while having a minimal mass and bulk.

DISCLOSURE OF THE INVENTION

For this purpose, the subject matter of the invention is an actuation system of the aforementioned type, including a generator rotating electric machine, a drive rotating electric machine, a control device and a matrix of switches, the generator rotating electric machine comprising a first rotor, intended to be mechanically coupled to a shaft of the engine forming a drive shaft, and a first stator comprising at least one output stator winding, the drive rotating electric machine comprising a second rotor, intended to be mechanically coupled to the lubrication pump for its actuation, and a second stator comprising at least one input stator winding, the matrix of switches being electrically connected, on the one hand, to the at least one output stator winding and, on the other hand, to the at least one input stator winding so as to electrically connect or disconnect the at least one output stator winding and the at least one input stator winding to/from each other according to a state of the matrix of switches, the control device being configured to, according to a state of a control signal, control the matrix of switches so as to electrically connect the at least one output stator winding and the at least one input stator winding to each other or not.

Indeed, such an actuation system does not have an electronic control member capable of having malfunctions because of the unfavourable temperature and vibration conditions in the nacelle. Indeed, the voltages delivered by the generator unit have the waveform necessary for the operation of the drive unit, so that the drive unit is capable of being directly driven in rotation by said voltages at the output of the generator unit, without it being necessary to arrange an electronic member for shaping voltages, such as an inverter, between these two rotating machines. This results in an actuation system for a lubrication pump that is more reliable and robust than the known actuation systems, while having a lesser mass and bulk.

The actuation system according to the invention has another particularly advantageous technical effect.

Indeed, on a lubrication pump, the need in terms of oil flow rate is proportional to the speed of rotation of the shafts of the engine.

However, the actuation system according to the invention is a linear system, that is to say that the speed of rotation of the first rotor of the drive rotating electric machine is proportional to the speed of rotation of the second rotor of the generator rotating electric machine. In other words, in the actuation system according to the invention, the voltage at the terminals of each winding of the generator rotating electric machine has an amplitude and a frequency that are directly a function of the speed of rotation of the first rotor (and thus of the drive shaft). Such a voltage, applied to each winding of the drive rotating electric machine, translates into a speed of rotation of the second rotor that is proportional to the speed of rotation of the first rotor, and thus to the speed of rotation of the drive shaft.

The above results in an additional advantage of the invention, namely that, according to the drive shaft to which the first rotor is coupled (preferably, the low-pressure shaft or a shaft of the fan of the engine), and via, optionally, at least one suitable reduction gear, the speed of rotation at which the lubrication pump is driven is provided to be always sufficient with respect to the need in terms of oil flow rate required according to the speed of rotation of the drive shaft, that is to say according to the speed of the engine. An electronic control member would thus be superfluous.

According to other advantageous aspects of the invention, the actuation system includes one or more of the following features, taken alone or according to all the technically possible combinations:

the control device is configured to control the matrix of switches, according to a direction of rotation of the first rotor of the generator unit, in order to connect the at least one output stator winding and the at least one input stator winding to each other so that a direction of rotation of the second rotor remains unchanged, regardless of the direction in which the first rotor of the generator unit is driven in rotation;

the control device comprises an analogue detection member configured to deliver a rotation signal representative of the direction of rotation of the first rotor of the generator unit;

the control device is configured to receive a control signal representative of the speed of rotation of a rotary member of the engine, preferably the drive shaft, the control device further being configured to control the matrix of switches in order to electrically connect the at least one output stator winding and the at least one input stator winding to each other if the value of the speed of rotation of the rotary member is less than or equal to a predetermined threshold and, preferably, to electrically disconnect the at least one output stator winding and the at least one input stator winding from each other if the value of the speed of rotation of the rotary member is greater than the predetermined threshold;

the matrix of switches comprises at least one electromechanical switch;

the generator rotating electric machine and/or the drive rotating electric machine is a synchronous machine with permanent magnets or an asynchronous machine.

Moreover, the object of the invention is an aircraft carrying a lubrication pump and an actuation system as defined above, the first rotor of the generator rotating electric machine being mechanically coupled to a shaft of an engine of the aircraft, the second rotor of the drive rotating electric machine being mechanically coupled to a lubrication pump of the engine, for the actuation of the lubrication pump.

BRIEF DESCRIPTION OF THE DRAWINGS

The invention will be better understood via the following description, given only as a non-limiting example and made while referring to the appended drawing in which:

FIG. 1 is a diagram of an actuation system according to the invention.

DETAILED DISCLOSURE OF SPECIFIC EMBODIMENTS

FIG. 1 shows a lubrication pump 2 and an actuation system 4 according to the invention.

The lubrication pump 2 is intended to supply oil to elements to be lubricated of an aircraft engine (not shown), such as bearings or transmissions. The lubrication pump 2 is, for example, an auxiliary lubrication pump of the engine.

The actuation system 4 is intended to draw energy at a shaft (called drive shaft) of the engine, and to use the energy drawn to actuate the lubrication pump 2. The drive shaft is, for example, the low-pressure shaft of the engine.

More precisely, the actuation system 4 includes a generator rotating electric machine 6 (called generator unit) and a drive rotating electric machine 8 (called drive unit), electrically connected to each other, advantageously by a matrix of switches 11 controlled by a control device 10.

The generator unit 6 is configured to draw mechanical energy at the drive shaft, and to convert the mechanical energy drawn into electric energy.

The drive unit 8 is configured to receive the electric energy generated by the generator unit 6, and to convert the electric energy received into mechanical energy intended to actuate the lubrication pump 2.

Preferably, each one out of the generator unit 6 and the drive unit 8 is a synchronous machine with permanent magnets or an asynchronous machine. In particular, the generator unit 6 is a synchronous machine with permanent magnets or an asynchronous machine, and the drive unit 8 is an asynchronous machine or a brushless DC motor. For example, the generator unit 6 is a synchronous machine with permanent magnets and the drive unit 8 is an asynchronous machine.

The generator unit 6 comprises a rotor 12 (called first rotor) and a stator 14 (called first stator).

The first rotor 12 is mechanically coupled to the drive shaft via any suitable mechanical transmission member such as a reduction gear.

The first stator 14 includes at least one winding 16, called output stator winding, for example three output stator windings 16.

The drive unit 8 comprises a rotor 18 (called second rotor) and a stator 20 (called second stator).

The second rotor 18 is mechanically coupled to the lubrication pump 2, directly or via at least one reduction gear, to cause its actuation.

The second stator 20 includes at least one winding 22, called input stator winding, for example three input stator windings 22.

The at least one output stator winding 16 and the at least one input stator winding 22 are electrically connected to each other. In other words, each output stator winding 16 is connected to a corresponding input stator winding 22 without any power electronic component, such as a transistor or a thyristor, being arranged between them. Advantageously, each output stator winding 16 is connected to a corresponding input stator winding 22 via a switch of the matrix of switches 11.

In this way, when the first rotor 12 of the generator unit 6 is driven in rotation, it circulates a current between the at least one output stator winding 16 and the at least one input stator winding 22. Such a current leads to the rotation of the second rotor 18 of the drive unit 8, which actuates the lubrication pump 2.

Preferably, the control device 10 is configured to control the matrix of switches 11 so as to electrically connect or disconnect the at least one output stator winding 16 and the at least one input stator winding 22 to/from each other. In particular, the control device 10 is configured to receive a control signal, for example coming from a computer of the aircraft, and to control the matrix of switches 11 so as to connect or disconnect to/from each other the at least one output stator winding 16 and the at least one input stator winding 22 according to a state of the control signal.

According to another example, the control signal is a signal of measurement of speed of rotation delivered by a sensor of the aircraft. Such a measurement signal is representative of the speed of rotation of a rotary member of the engine, preferably the speed of rotation of the low-pressure shaft or of a fan of the engine. In this case, the control device 10 is configured to control the matrix of switches 11 so as to electrically connect the at least one output stator winding 16 and the at least one input stator winding 22 to each other if the value of the speed of rotation of the rotary member is less than or equal to a predetermined threshold. This predetermined threshold can correspond to the appearance of a condition in which at least one pump of a main lubrication system no longer rotates fast enough to be able to correctly ensure the lubrication of a transmission of the engine, so that the lubrication pump 2 must compensate for this lack as a pump of an auxiliary lubrication system of the transmission. Preferably, the control device 10 is also configured to control the matrix of switches 11 so as to electrically disconnect the at least one output stator winding 16 and the at least one input stator winding 22 from each other if the value of the speed of rotation of the rotary member is greater than the predetermined threshold.

In this way, in the case in which the lubrication pump 2 is an auxiliary lubrication pump, the lubrication pump 2 is advantageously actuated only when a main lubrication pump requires assistance, in particular during a turning off of the engine in flight or on the ground with a phase of autorotation of the fan of the engine.

For example, the matrix of switches 11 comprises a set of switches, preferably electromechanical switches, electrically connected, on the one hand, to the at least one output stator winding 16 and, on the other hand, to the at least one input stator winding 22, the on or off state of each switch being controlled by the control device 10.

Preferably, the control device 10 comprises an analogue detection member 24 configured to deliver a rotation signal, the state of which is representative of a direction of rotation of the first rotor 12 of the generator unit 6. Such a rotation signal also forms a control signal of the control device 10.

For example, the analogue detection member 24 is configured to deliver a rotation signal according to the value taken by the voltage at the terminals of the at least one output stator winding 16 of the generator unit 6. In this case, the control device 10 is also configured to control the matrix of switches 11 so as to cause a phase inversion at the drive unit 8, that is to say cause a modification of the connection between the at least one output stator winding 16 and the at least one input stator winding 22 so that a direction of rotation of the second rotor 18 remains unchanged, regardless of the direction in which the first rotor 12 of the generator unit 6 is driven in rotation. In other words, regardless of the direction in which the first rotor 12 of the generator unit 6 is driven in rotation, the second rotor 18 always rotates in the same predetermined direction, so that the lubrication pump 2 is also always driven in the same direction.

The use of the analogue detection member 24 is advantageous, insofar as by avoiding the use of a partly or totally digital member to deliver the rotation signal, the robustness of the actuation system 4 is reinforced.

What is claimed is:

1. An actuation system for a lubrication pump of an aircraft engine, including a generator rotating electric machine, a drive rotating electric machine, a control device and a matrix of switches, the generator rotating electric machine comprising a first rotor, intended to be mechanically coupled to a shaft of the aircraft engine forming a drive shaft, and a first stator comprising at least one output stator winding, the drive rotating electric machine comprising a second rotor, intended to be mechanically coupled to the lubrication pump for its actuation, and a second stator comprising at least one input stator windings, the matrix of switches being electrically connected, on the one hand, to the at least one output stator winding and, on the other hand, to the at least one input stator winding so as to electrically connect or disconnect the at least one output stator winding and the at least one input stator winding to/from each other, the control device being configured to, according to a state of a control signal, control the matrix of switches so as to electrically connect the at least one output stator winding and the at least one input stator winding to each other or not, the control device further being configured to control a configuration of the matrix of switches, according to a direction of rotation of the first rotor of the generator rotating electric machine, the control device being configured to place the matrix of switches in a first configuration of switches when the first rotor of the generator rotating electric machine has a first direction of rotation and is further configured to place the matrix of switches in a second configuration of switches different from said first configuration of switches when the first rotor of the generator rotating electric machine has a second direction of rotation opposite to the first direction of rotation, the first configuration of switches and the second configuration of switches being provided so that when the first rotor of the generator rotating electric machine is driven in rotation in the first direction, the second rotor has a given direction of rotation, and when the first rotor of the generator rotating electric machine is driven in rotation in the second direction, the second rotor retains the said given direction of rotation.

2. The actuation system according to claim 1, wherein the control device is configured to receive a rotation signal based on a voltage value acquired at a terminal of the at least one output stator winding, said rotation signal being representative of the direction of rotation of the first rotor of the generator rotating electric machine.

3. The actuation system according to claim 1, wherein the control device is configured to receive a control signal representative of the speed of rotation of a rotary member of the aircraft engine, the control device further being configured to control the matrix of switches in order to electrically connect the at least one output stator winding and the at least one input stator winding to each other if the value of the speed of rotation of the rotary member is less than or equal to a predetermined threshold.

4. The actuation system according to claim 3, wherein the rotary member is the shaft.

5. The actuation system according to claim 3, wherein the control device is further configured to control the matrix of switches in order to electrically disconnect the at least one output stator winding and the at least one input stator winding from each other if the value of the speed of rotation of the rotary member is greater than the predetermined threshold.

6. The actuation system according to claim 1, wherein the matrix of switches comprises at least one electromechanical switch.

7. The actuation system according to claim 1, wherein the generator rotating electric machine and/or the drive rotating electric machine is a synchronous machine with permanent magnets or an asynchronous machine.

8. An aircraft carrying a lubrication pump and the actuation system according to claim 1,
- the first rotor of the generator rotating electric machine being mechanically coupled to the shaft of the aircraft engine,
- the second rotor of the drive rotating electric machine being mechanically coupled to a lubrication pump of the aircraft engine, for the actuation of the lubrication pump.

* * * * *